(12) United States Patent
Löhken et al.

(10) Patent No.: US 12,139,098 B2
(45) Date of Patent: Nov. 12, 2024

(54) FLUID DAMPER FOR MODULATING A RETAINING FORCE OF A SEAT BELT

(71) Applicant: STABILUS GMBH, Koblenz (DE)

(72) Inventors: Lars Löhken, Linz (DE); Raphael Piroth, Koblenz (DE); Markus Müller, Koblenz (DE); Ulrich Probst, Hillscheid (DE); Christian Junghans, Duisburg (DE)

(73) Assignee: STABILUS GmbH, Koblenz (DE)

( * ) Notice: Subject to any disclaimer, the term of this patent is extended or adjusted under 35 U.S.C. 154(b) by 308 days.

(21) Appl. No.: 17/861,300

(22) Filed: Jul. 11, 2022

(65) Prior Publication Data

US 2023/0018695 A1 Jan. 19, 2023

(30) Foreign Application Priority Data

Jul. 12, 2021 (DE) ...................... 10 2021 117 898.3

(51) Int. Cl.
*B60R 22/46* (2006.01)

(52) U.S. Cl.
CPC ................ *B60R 22/4676* (2013.01)

(58) Field of Classification Search
CPC ............ B60R 22/4676; B60R 22/1954; B60R 22/1955
See application file for complete search history.

(56) References Cited

U.S. PATENT DOCUMENTS

| | | | | |
|---|---|---|---|---|
| 3,750,856 | A |   | 8/1973 | Kenworthy |
| 3,942,819 | A | * | 3/1976 | Schwanz ............. B60R 22/4633 297/480 |
| 4,008,909 | A | * | 2/1977 | Otani .................. B60R 22/1955 297/480 |
| 4,152,025 | A | * | 5/1979 | Bendler ............. B60R 22/1955 297/480 |
| 5,234,181 | A | * | 8/1993 | Schroth ............... B60R 22/1953 297/480 |
| 8,678,510 | B2 | * | 3/2014 | Masutani ............ B60R 22/1955 297/480 |

(Continued)

FOREIGN PATENT DOCUMENTS

| | | |
|---|---|---|
| DE | 2517539 A1 | 10/1975 |
| DE | 29880147 U1 | 5/2000 |
| DE | 10113502 A1 | 9/2002 |

(Continued)

*Primary Examiner* — Faye M Fleming
(74) *Attorney, Agent, or Firm* — Schmeiser, Olsen & Watts LLP

(57) ABSTRACT

A fluid damper for modulating a retaining force of a seat belt is provided. The fluid damper includes an outer cylinder and an inner cylinder. The inner cylinder encloses an inner space. The fluid damper includes a piston shiftable in the inner space. The fluid damper includes a duct. The duct conductively connects a front fluid chamber disposed in front of the piston to a rear fluid chamber disposed behind the piston and/or a reservoir for the damping fluid. The duct includes an outer duct portion and an inner duct portion. The inner cylinder is deflectable from a rest position by a force acting on the piston so that the deflection of the inner cylinder causes an adjustment of an overlap of the outer duct portion and the inner duct portion depending on the magnitude of the force.

13 Claims, 10 Drawing Sheets

(56) References Cited

U.S. PATENT DOCUMENTS

2023/0219519 A1\* 7/2023 Löhken .................. B60R 22/28
 280/805

FOREIGN PATENT DOCUMENTS

| DE | 102004045864 A1 | \* | 3/2006 | ......... B60R 22/1952 |
| DE | 102012004603 A1 | | 9/2013 | |
| EP | 2 951 459 B1 | | 5/2020 | |
| GB | 2330335 A | \* | 4/1999 | ............. B60R 22/28 |

\* cited by examiner

FLUID DAMPER FOR MODULATING A RETAINING FORCE OF A SEAT BELT

CROSS-REFERENCE TO RELATED APPLICATIONS

This application claims priority to German Application No. 10 2021 117 898.3, having a filing date of Jul. 12, 2021, the entire contents of which are hereby incorporated by reference.

FIELD OF TECHNOLOGY

The following relates to a fluid damper for modulating a retaining force of a seat belt. The fluid damper comprises an outer cylinder and an inner cylinder disposed in the outer cylinder coaxial to a common longitudinal axis, the inner cylinder enclosing an inner space filled with a damping fluid, the fluid damper comprising a piston shiftable in the inner space along the longitudinal axis along a stroke length, the fluid damper comprising at least one duct, and the at least one duct conductively connecting for the damping a front fluid chamber fluid arranged in front of the piston along the longitudinal axis to a rear fluid chamber arranged behind the piston along the longitudinal axis and/or a reservoir for the damping fluid arranged outside of the inner space.

The following further relates to a belt force limiter comprising the fluid damper.

BACKGROUND

In modern vehicles, various safety systems take effect for protecting the passengers in case of a crash. Among these are, e.g., a seat belt tensioner, an airbag, or a belt force limiter. Here, the seat belt tensioner first ensures that a belt potentially put on too loosely rests against the passenger with an initial tension. To protect the passenger's shoulder area and to, at the same time, make use of the maximum effect of the airbag, the belt force limiter ensures that the passenger's head purposefully hits the airbag after a specific time and a specific distance and a critical load on the shoulder area is not exceeded by limiting the retaining force with which the belt retains the passenger.

Here, known systems do not, or only under the influence of additional sensor systems, respond to different passenger weights so that the retaining force is not optimally adapted to the passenger weight or an impact speed of the vehicle. Therefore, it may occur that a heavy passenger is not adequately decelerated by an insufficient retaining force before hitting the airbag at a high impact speed, or that a light passenger is held back by a retaining force too high for her shoulder area at a low impact speed. In both cases, severe injuries may be the consequence.

The patent application DE10113502A1 describes a belt retractor comprising a hydraulic belt force limiter. For example, the spindle of the belt retractor moves a nut having throttle bores through a cavity filled with a hydraulic fluid. Owing to the use of a hydraulic force limiter, the unwinding length of the seat belt is, according to DE10113502A1, independent of the impact speed of the motor vehicle. However, the DE10113502A1 does not solve the problem that the unwinding length depends on the mass of the secured person.

The patent application DE102012004603A1 describes a belt reel comprising a force limiter containing a displacement member moving in a granulate. According to DE102012004603A1, the use of a granulate has the effect that the resistance generated by force limiter increases when the pull-out speed of the seat belt increases so that the same forward displacement is obtained irrespective of the mass of the retained person.

The utility model DE29880147U1 describes a vehicle passenger retaining system automatically adapting a load limitation to the mass of the retained person by the retaining force being adapted to depend on the displacement of the person. To this end, the retaining system comprises, for example, piston-cylinder means comprising a cylinder having shearable or compressible inner ribs the width of which increases along the cylinder. The ribs thereby generate a movement resistance increasing along the cylinder on the piston. In this way, a light person causing only a small shift of the piston will experience a smaller retaining force than a heavy person. However, the disadvantage of this concept is that the stroke of the piston-cylinder means is not optimally used and that a non-uniform progress of the retaining force with high maxima is produced.

The known systems for adapting the retaining force offer only limited adaptation to the passenger mass, have a complicated configuration and/or do not ensure that the passenger is smoothly decelerated along the available braking distance between the seat and the airbag so that load peaks on the passengers occur which may cause injuries.

SUMMARY

An aspect relates to a device which is as cost-effective as possible, has a simple design, is long-lived, and renders a deceleration of the passenger adapted to a passenger weight of a passenger and/or an impact speed of a vehicle by a seat belt possible.

A fluid damper according to embodiments of the invention is designed for modulating a retaining force of a seat belt. The fluid damper may also be used for other applications, for example as a self-adjusting stop damper the damping force of which automatically adapts to the impact energy of an object impinging on the stop damper, for example a flap of a vehicle.

The fluid damper comprises an outer cylinder and an inner cylinder arranged in the outer cylinder coaxial to a common longitudinal axis, the inner cylinder comprising an inner space filled with a damping fluid. The outer cylinder and the inner cylinder together form a cylinder of the fluid damper. The damping fluid is, for example, a damping liquid, particularly a hydraulic oil. In embodiments, the outer cylinder and the inner cylinder have substantially the form of a hollow cylinder, respectively.

The fluid damper comprises a piston shiftable in the inner space along the longitudinal axis, for example, from a rear end portion of a stroke length to a front-end portion to the stroke length, and also vice versa. The piston is rotationally symmetrical to the longitudinal axis in embodiments.

The piston is, for example, fixed to a piston rod lead out of the outer cylinder and the inner cylinder along the longitudinal axis. The piston rod and the outer cylinder and/or inner cylinder may comprise coupling elements for coupling the piston rod to the seat belt and for coupling the cylinder to a seat or a chassis of a vehicle or vice versa. In this way, the piston can be shifted in the inner space along the stroke length by a pull-out movement of the seat belt relative to the seat or to the chassis. Here, the pull-out movement is dampened by a damping force of the fluid damper.

The fluid damper comprises at least one duct, the at least one duct conductively connecting for the damping fluid a front fluid chamber located in front of the piston along the longitudinal axis to a rear fluid chamber located behind the piston along the longitudinal axis and/or a reservoir for the damping fluid located outside of the inner space. In the former case, the at least one duct for the damping fluid forms a bypass through which the damping fluid can flow around the piston from the front fluid chamber into the rear fluid chamber and vice versa.

In embodiments, the piston divides the inner space, particularly in a manner sealing for the damping fluid, into the front fluid chamber in front of the piston along the longitudinal axis and the rear fluid chamber behind the piston along the longitudinal axis.

When the duct conductively connects the front fluid chamber for the damping fluid to the reservoir located outside of the inner space, the piston may, for example, be configured so that only the front fluid chamber in front of the piston along the longitudinal axis exists and that there is no rear fluid chamber behind the piston along the longitudinal axis. The inner space may, in this embodiment, for example, be completely filled by the piston and/or the piston rod on the side of the piston opposite to the front fluid chamber along the longitudinal axis.

When the piston is shifted along the stroke length by the pull-out movement of the seat belt the damping fluid flows through the at least one duct from the front fluid chamber into the rear fluid chamber and/or into the reservoir or vice versa. Therefore, a damping force by which the fluid damper dampens the pull-out movement is substantially determined by a flow resistance counteracting the flow of the damping fluid through the at least one duct.

In embodiments, the at least one duct comprises an outer duct portion in the outer cylinder and an inner duct portion in the inner cylinder. In order that the inner duct portion interacts as a duct for the damping fluid together with the outer duct portion, the inner duct portion and the outer duct portion overlap along the shell surfaces of the outer cylinder and of the inner cylinder. The overlap of the duct portions at the boundary surface between the inner duct portion and the outer duct portion is referred to as overlap of the duct portions.

In embodiments, an outer shell surface of the inner cylinder abuts on an inner shell surface of the outer cylinder to be sealing for the damping fluid. This means that the inner cylinder is disposed in the outer cylinder so that the damping fluid cannot pass between inner cylinder and outer cylinder.

In embodiments, the inner cylinder is deflectable relative to the outer cylinder from a rest position by a force acting on the piston along the longitudinal axis so that the deflection of the inner cylinder causes an adjustment of an overlap of the outer duct portion and the inner duct portion along the shell surfaces depending on the magnitude of the force. The deflection may be a linear deflection along the longitudinal axis and/or a rotational deflection about the longitudinal axis. Relative to an environment of the fluid damper, the inner cylinder and/or the outer cylinder may move due to the deflection. In embodiments, for a structurally simple design of the fluid damper, for example, only the inner cylinder moves relative to the surrounding area.

The flow resistance of the damping fluid through the duct and the resulting damping force of the fluid damper increase when the overlap of the duct portions decreases. Therefore, the deflection of the inner cylinder causes an automatic adjustment of the damping force of the fluid damper depending on the magnitude of the force acting on the piston.

The overlap may, for example, be maximum in the rest position when no or only a small force acts on the piston, and decrease when the inner cylinder is deflected from the rest position by an increasing force. In this embodiment, the force acting on the piston causes the damping force of the fluid damper to automatically increase with an increasing force on the piston by the deflection of the inner cylinder. This means that, when a passenger exerts a large force on the seat belt and therefore on the piston due to his high mass or due to a high impact speed, the passenger is held back by a higher damping force than a more lightweight passenger or a passenger in case of an accident at a lower impact speed. The damping force therefore automatically adapts to the mass of the passenger and to the impact speed so that, on the one hand, a load on the passenger by the seat belt can be kept as low as possible, and that, on the other hand, the retaining force is high enough so that the passenger does not hit the airbag with an excessive kinetic energy.

Description of the Embodiments

In embodiments, the inner cylinder is linearly deflectable from the rest position along the longitudinal axis by the force acting on the piston along the longitudinal axis so that the linear deflection of the inner cylinder causes an adjustment of the overlap of the outer duct portion and the inner duct portion along the shell surfaces depending on the magnitude of the force.

When the force acting along the longitudinal axis deflects the inner cylinder along the longitudinal axis this is advantageous in that that the force does not have to be redirected into another direction so that the fluid damper can have a particularly simple design.

In embodiments, a maximum deflection of the inner cylinder is substantially smaller than the length of the stroke length so that the pull-out length of the seat belt does not substantially change due to the deflection.

In embodiments, the fluid damper comprises a spring element. For example, the spring element comprises a helical compression spring.

The spring element counteracts the deflection of the inner cylinder relative to the outer cylinder from the rest position. The spring force and/or spring characteristic of the spring element therefore determines the interrelation between the magnitude of the force acting on the piston and the deflection of the inner cylinder and thus the damping force of the fluid damper. By selecting an appropriate spring element, it is therefore possible to adjust how the damping force of the fluid damper responds to the force acting on the piston. In an otherwise identical embodiment, therefore, the fluid damper can be adapted to different requirements in a simple manner by exchanging the spring element.

In embodiments, the spring element biases the inner cylinder relative to the outer cylinder towards the rest position, particularly along the longitudinal axis. The bias ensures that the inner cylinder is not unintentionally deflected even by small forces which might lead to a malfunction of the fluid damper.

In embodiments, the inner cylinder is movable relative to the outer cylinder by shifting the piston which takes place relative to the outer cylinder along the longitudinal axis, for example linearly movable along the longitudinal axis or rotatably movable about the longitudinal axis so that the movement of the inner cylinder causes an adjustment of the overlap of the outer duct portion and the inner duct portion along the shell surfaces depending on the position of the piston along the stroke length. Relative to an environment of the fluid damper, the inner cylinder and/or the outer cylinder may move due to the movement. In embodiments, for a structurally simple design of the fluid damper, for example, only the inner cylinder moves relative to the surroundings.

The flow resistance of the damping fluid through the duct and the resulting damping force of the fluid damper increase when the overlap of the duct portions decreases. Therefore, the movement of the inner cylinder causes an automatic adjustment of the damping force of the fluid damper depending on the position of the piston along the stroke length.

In an embodiment, the outer duct portion and the inner duct portion overlap less when the piston is in one of the two end portions of the stroke length than when the piston is in a central portion of the stroke length located between the end portions. In this embodiment, the movement of the inner cylinder causes an increase of the flow resistance of the damping fluid through the duct in a state in which the piston is in the end portions as compared to a state in which the piston is in the central portion.

In case of an accident, the pull-out speed of the seat belt first increases strongly, and then drops again due to the retaining force of the seat belt as well as, potentially, due to the contact of the passenger with the airbag, down to the complete standstill of the pull-out movement. Due to the fluid dynamics, the damping force of a fluid damper according to prior art coupled to the seat belt would also first strongly increase together with the pull-out speed, and then drop again. This might lead to an excessive load on the passenger due to an excessive retaining force of the seat belt in a central portion of the pull-out movement.

When the overlap of the duct portions is smaller when the piston is in the two end portions than when the piston is in the central portion this will prevent an excessive increase in the damping force together with the pull-out speed of the seat belt in the central portion.

In an embodiment, the overlap of the duct portions changes continuously depending on the position of the piston along the stroke length to ensure a uniform load on the passenger.

In embodiments, the progression of the overlap of the duct portions depending on the position of the piston along the stroke length is selected so that the damping force of the fluid damper is constant along the stroke length at an expected progression of the pull-out speed. To this end, the progression of the overlap depending on the position of the piston along the stroke length is, for example, proportional to the progression of the pull-out speed depending on the position of the piston along the stroke length.

In an embodiment, the overlap of the duct portions is complete when the piston is in the central portion and/or the duct portions do not overlap each other when the piston is in one of the end portions. In this way, a particularly high variability of the overlap is achieved so that even at a pull-out speed having a high variability a constant damping force can be obtained.

When the duct portions do not overlap the damping fluid cannot flow through the duct from the front fluid chamber into the rear fluid chamber and/or the reservoir or vice versa. This means that, when the fluid damper comprises no other ducts for the damping fluid connecting the front fluid chamber to the rear fluid chamber and/or the reservoir, the piston can only be shifted by it compressing the damping fluid in the shifting direction in the front piston in the state in which no overlap exists.

In an embodiment, the inner cylinder is rotatably movable by shifting the piston relative to the outer cylinder about the longitudinal axis so that the rotational movement of the inner cylinder causes an adjustment of the overlap of the outer duct portion and the inner duct portion along the shell surfaces depending on the position of the piston along the stroke length.

A rotation of the inner cylinder relative to the outer cylinder is advantageous in that it can be combined with a shift of the inner cylinder relative to the outer cylinder along the longitudinal axis for adapting the damping force to a mass of the passenger or an impact speed without mutual interference.

In embodiments, the inner cylinder is rotatable relative to the outer cylinder about the longitudinal axis by the piston via a slide guide. For example, a rotation of the inner cylinder relative to the outer cylinder can be achieved by a projection of the piston engaging in a guide groove of the inner cylinder.

In an embodiment, the at least one duct comprises or is a radial duct, for example a radial nozzle, for the passage of the damping fluid radial to longitudinal axis from the front fluid chamber through the shell wall of the inner cylinder and of the outer cylinder. The radial duct is advantageous in that, with it, an adjustment of the overlap of the duct portions can be realised both depending on the position of the piston along the stroke length, e.g. by a linear deflection of the inner cylinder relative to the outer cylinder along the longitudinal axis, and on the force acting on the piston, e.g. by a rotational movement of the inner cylinder relative to the outer cylinder about the longitudinal axis, with a particularly simple duct geometry, particularly with a round hole or elongated hole through inner cylinder and outer cylinder, respectively. In this way, a retaining force of the seat belt which is both constant along the stroke length and adapted to the mass of the passenger or the impact speed can be achieved by the fluid damper in a particularly simple manner.

The radial duct may, for example, lead from the front fluid chamber into a reservoir for the damping fluid located outside of the inner space or via a bypass, for example between the outer cylinder and another cylinder disposed around the outer cylinder, into the rear fluid chamber.

The reservoir may have a fixed volume for accommodating the damping fluid, or it may be configured so that the volume adapts to the amount of the accommodated damping fluid, for example by the reservoir comprising an elastic balloon. The reservoir may be closed or open for the damping fluid relative to an environment of the fluid damper. In a particularly simple embodiment of the fluid damper, the reservoir may not be part of the fluid damper, but, for example, an inner space or a partial inner space of a vehicle in which the fluid damper is used. In this embodiment, the damping fluid may be safe for the contact with humans, the damping fluid being, for example, nitrogen, air, or water.

In an embodiment, the at least one duct comprises or is a groove in the shell wall of the inner cylinder and of the outer cylinder for guiding the damping fluid past the piston from the front fluid chamber into the rear fluid chamber. The groove is advantageous in that the damping fluid can remain within the cylinder so that no parts of the duct and no reservoir for the damping fluid are required outside of the cylinder. In this way, the fluid damper can have a particularly space-efficient design.

The shell wall may comprise a plurality of grooves spaced apart from each other along the longitudinal axis and/or in the circumferential direction about the longitudinal axis. In an embodiment, the shell wall comprises precisely one groove since, in this way, the cylinder can be produced in a particularly simple manner, and a particularly smooth progression of the retaining force of the seat belt can be achieved.

Within the meaning of embodiments of the invention, both a recess in a component having a depth defined by a groove bottom and a complete aperture through a component are referred to as a "groove." When the shell wall is fully perforated by the groove the cylinder must be enclosed by a sleeve in a, for the damping fluid, tight manner at least around the at least one groove to prevent an uncontrolled leakage of the damping fluid from the cylinder.

In an embodiment, the groove is elongated, i.e., the at least one groove has a length which is substantially larger than a width orthogonal thereto.

In an embodiment, the at least one groove has a cross sectional area for the passage of the damping fluid, wherein the cross-sectional area may be variable along the stroke length and is, for example, smaller in the two end portions of the stroke length than in a central portion of the stroke length disposed between the two end portions.

The flow resistance of the damping fluid, and therefore the damping force of the damper, is mainly determined by the cross-sectional area of the at least one groove adjacent to the piston at a predetermined flow velocity of the damping fluid. Therefore, a small cross sectional area results in a large flow resistance and therefore a large damping force, whereas a large cross sectional area results in a small flow resistance and thus a small damping force.

When the cross-sectional area adjacent to the piston is smaller in the two end portions of the stroke length than in the central portion this will prevent an excessive increase in the damping force together with the pull-out speed of the seat belt in the central portion.

In an embodiment, the cross-sectional area changes continuously depending on the stroke length to ensure a uniform load on the passenger.

In an embodiment, the course of the cross-sectional area depending on the stroke length is selected so that the damping force of the fluid damper is constant at an expected progression of the pull-out speed along the stroke length. To this end, the course of the cross-sectional area depending on the stroke length is, for example, proportional to the progression of the pull-out speed depending on the stroke length.

In an embodiment, the at least one groove has a width in the circumferential direction about the longitudinal axis, the width being variable along the stroke length, and the width in embodiments being smaller in the two end portions of the stroke length than in the central portion of the stroke length. A groove having a variable width is advantageous in that it can have a constant depth radial to the longitudinal axis so that a thickness of the shell wall can be selected so that it is particularly small. In this way, the fluid damper can be produced in a particularly material-saving and light-weight way, for example by producing the cylinder from a drawn pipe.

In an embodiment, the at least one groove has a depth radial to the longitudinal axis, the depth being variable along the stroke length, and the depth in embodiments being smaller in the two end portions of the stroke length than in the central portion of the stroke length. A groove having a variable depth is advantageous in that it can have a constant width in the circumferential direction about the longitudinal axis so that it can be produced in a particularly simple way. For example, such a groove can be milled into the shell in a single work step.

In an embodiment, the at least one groove helically surrounds the longitudinal axis, a pitch of the groove being variable along the longitudinal axis along the stroke length, and the pitch in embodiments being larger in the two end portions of the stroke length than in the central portion of the stroke length. A helical groove having a variable pitch can have a constant depth radial to the longitudinal axis so that the thickness of the shell wall can be selected so that it is particularly small. Moreover, such a groove is particularly simple to produce and can, for example, be milled or laser-cut into the shell or produced using a moulding tool in a single work step.

Within the meaning of embodiments of the invention, the term "helical" means that the at least one groove extends, at least in sections, in a direction between the circumferential direction about the longitudinal axis and an axial direction along the longitudinal axis. Here, the groove may describe at least one complete revolution about the longitudinal axis, particularly more than one complete revolution about the longitudinal axis. A more than complete revolution may have a positive effect on the spring behaviour of the fluid damper.

In embodiments, the at least one groove comprises an outer groove section in the outer cylinder and an inner groove section in the inner cylinder. For the inner groove section to form the at least one groove together with the outer groove section the inner groove section is an aperture through the inner cylinder. The outer groove section may have a groove bottom or be an aperture through the outer cylinder.

When the inner cylinder is movable relative to the outer cylinder by shifting the piston relative to the outer cylinder which takes place along the longitudinal axis the movement of the inner cylinder may cause an adjustment of the overlap of the outer groove section and the inner groove section along the shell surfaces depending on the position of the piston along the stroke length, the outer groove section and the inner groove section in embodiments having a smaller overlap when the piston is in one of the two end portions of the stroke length than when the piston is in the central portion of the stroke length.

Consequently, when the outer and the inner groove section have a small overlap, the groove has a small depth effective for the passage of the damping fluid radial to the longitudinal axis and therefore a small cross-sectional area for the passage of the damping fluid. Therefore, the shift of the piston by the movement of the inner cylinder causes the cross-sectional area to be smaller when the piston is in the end portions than when the piston is in the central portion.

When the inner cylinder is displaced relative to the outer cylinder from the rest position by a force acting on the piston along the longitudinal axis the deflection of the inner cylinder may cause an adjustment of an overlap of the groove section and the groove section along the shell surfaces depending on the magnitude of the force, the outer groove section and the inner groove section, in particular, having a larger overlap when the inner cylinder is in the rest position than when the inner cylinder is displaced from the rest position.

Thus, by the deflection of the inner cylinder, the force acting on the piston causes a decrease of the cross-sectional area of the groove for the passage of the damping fluid adjacent to the piston when the force increases, and therefore an increase in the damping force. This means that, when a passenger exerts a large force on the seat belt and thus on the piston due to his high mass or a high impact speed, the passenger is held back by a higher damping force than a passenger who is more light-weight or has an accident with a lower impact speed. So, the damping force automatically adapts to the mass of the passenger and the impact speed so that, on the one hand, a load on the passenger by the seat belt can be kept as low as possible, and that, on the other hand, the retaining force is high enough so that the passenger does not hit the airbag with an excessive kinetic energy.

In an embodiment, the at least one groove has a height along a deflection direction of the deflection of the inner cylinder from the rest position, the height being constant along the stroke length. In this way, it is ensured that a given deflection of the inner cylinder causes the same relative change of the damping force irrespective of a position of the piston along the stroke length. Thus, the adaptation of the damping force to the mass of the passenger or the impact speed takes place equally along the entire stroke length so that the passenger experiences a retaining force equally adapted to his/her mass or the impact speed over the entire pull-out length of the seat belt.

Embodiments of the invention relate to a belt force limiter for a seat belt comprising a fluid damper for modulating a retaining force of the seat belt.

For example, the piston of the fluid damper is fixed to a piston rod lead out of the cylinder along the longitudinal axis of the cylinder of the fluid damper. The piston rod may be coupled to the seat belt via a coupling element, and the cylinder may comprise another coupling element for coupling it to a seat or a chassis of a vehicle or vice versa. In this way, the piston can be shifted in the cylinder into the cylinder or out of the cylinder along the stroke length by a pull-out movement of the seat belt relative to the seat or to the chassis. In the process, the pull-out movement is damped by a damping force of the fluid damper which results in the advantages and design options described above in connection with the fluid damper.

BRIEF DESCRIPTION

Some of the embodiments will be described in detail, with references to the following Figures, wherein like designations denote like members, wherein.

Figure 6:
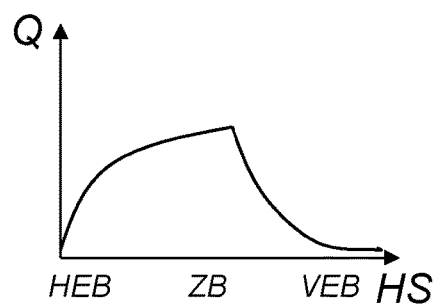
Figure 7:
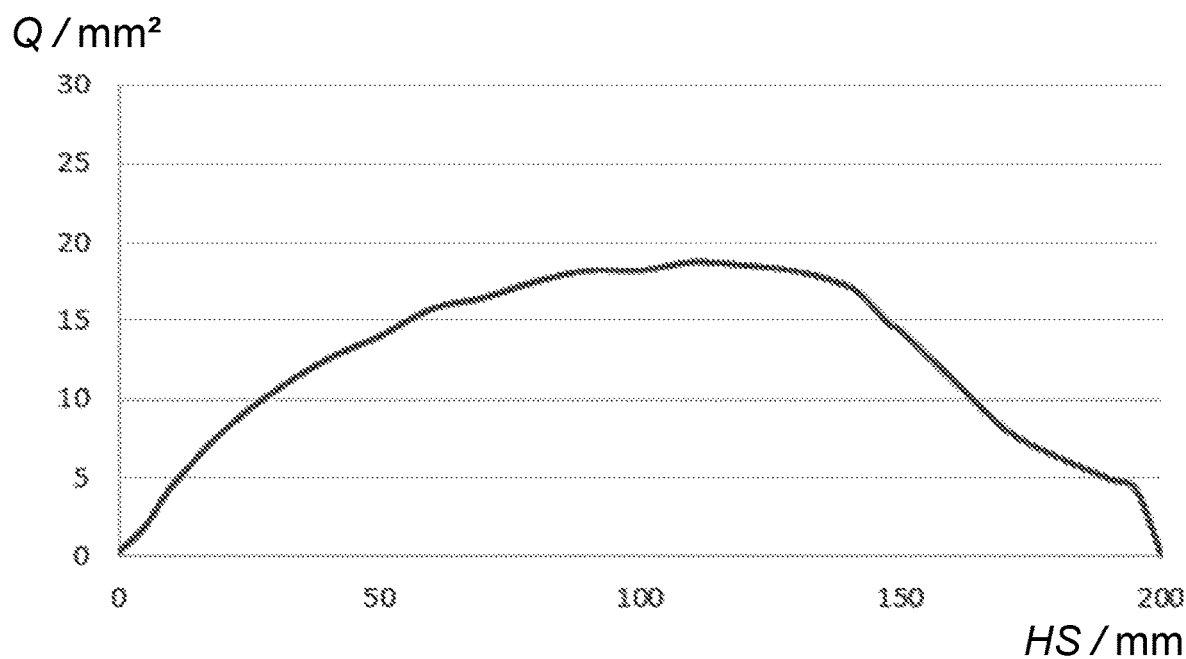
Figure 8:
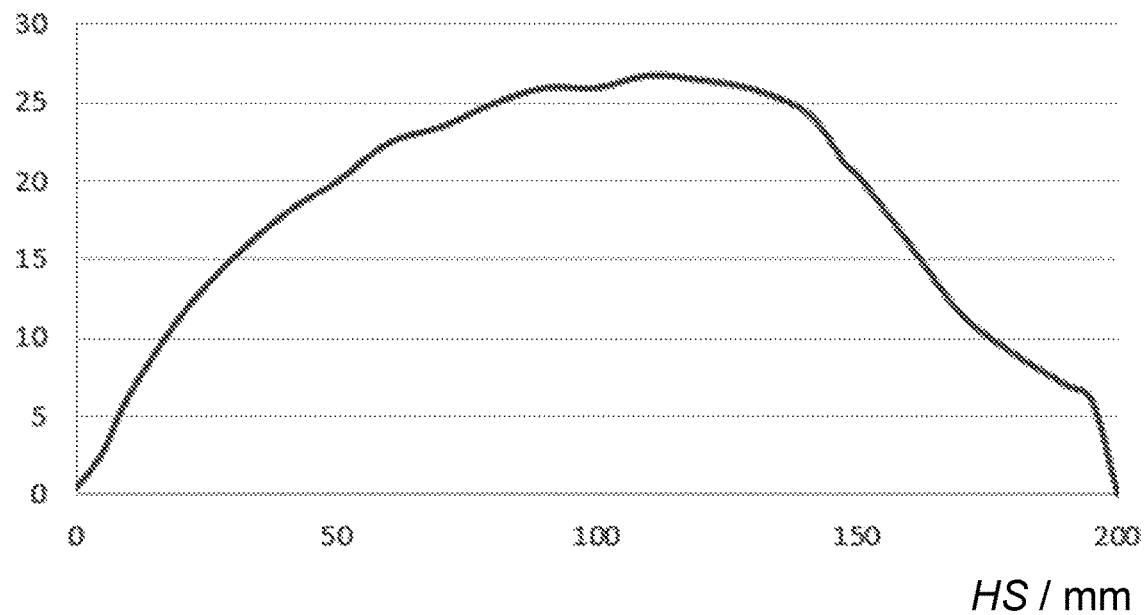
Figure 9:
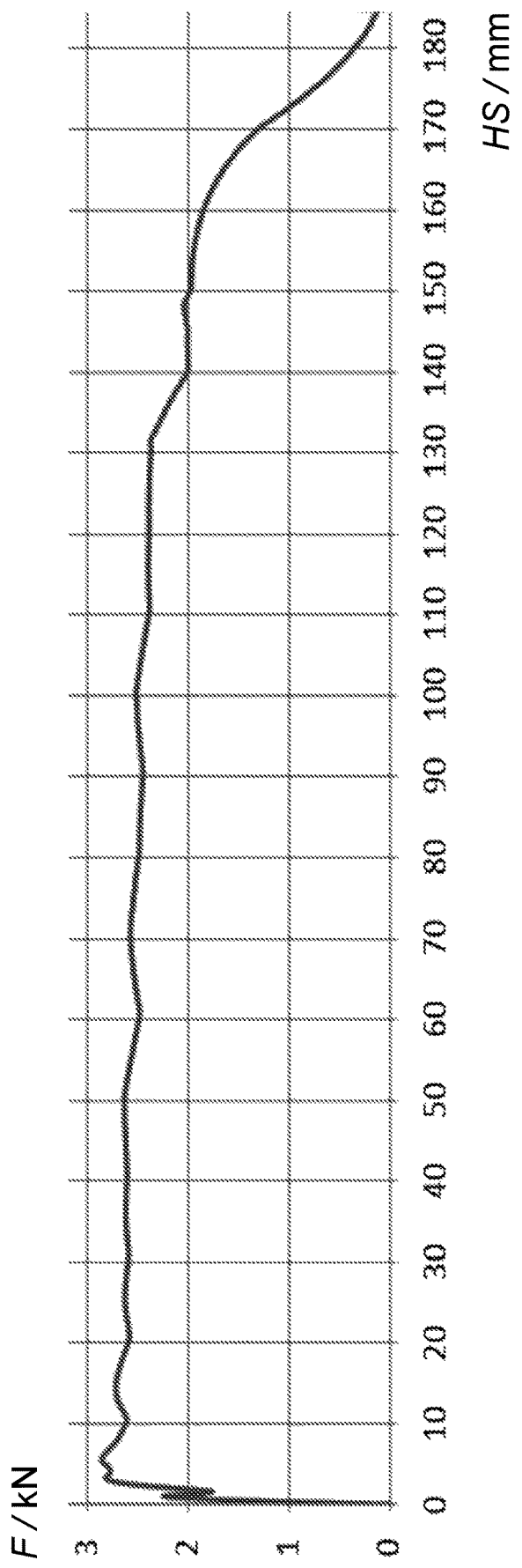
Figure 10:
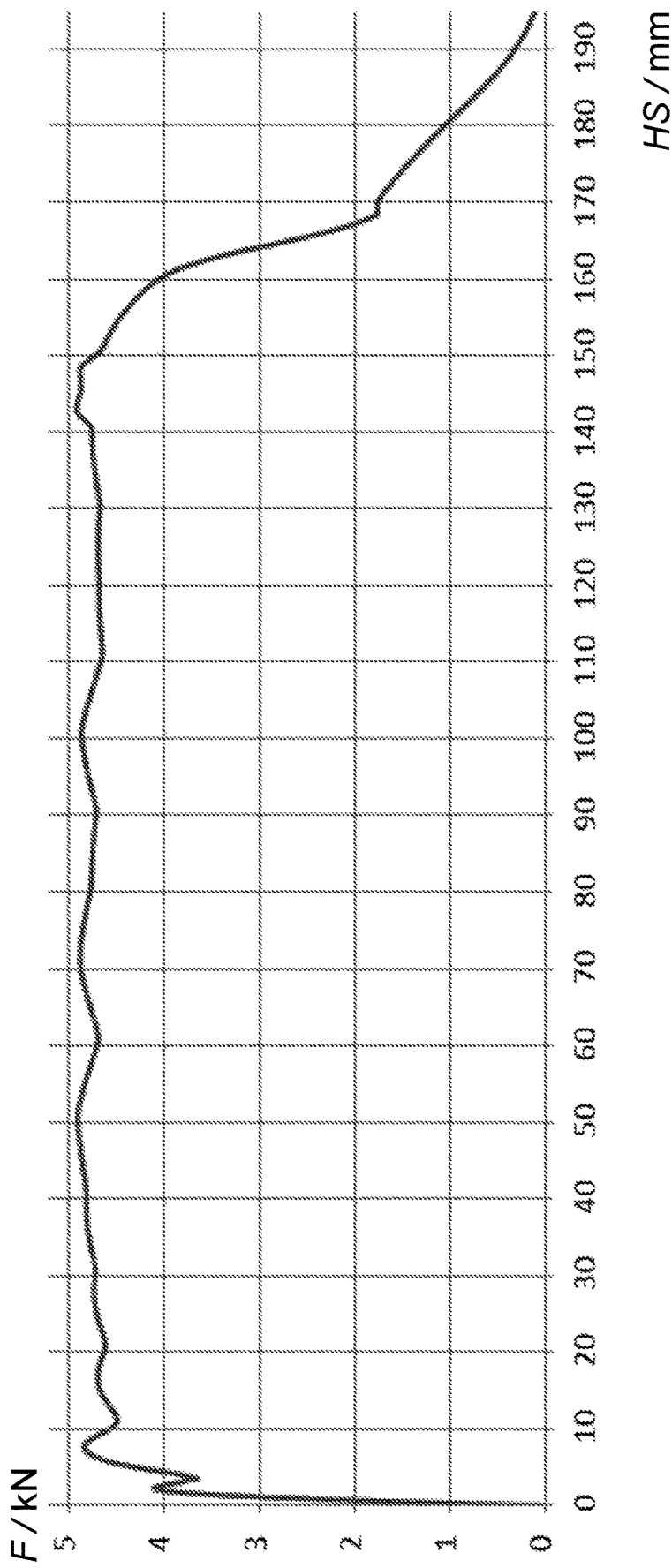
Figure 11:
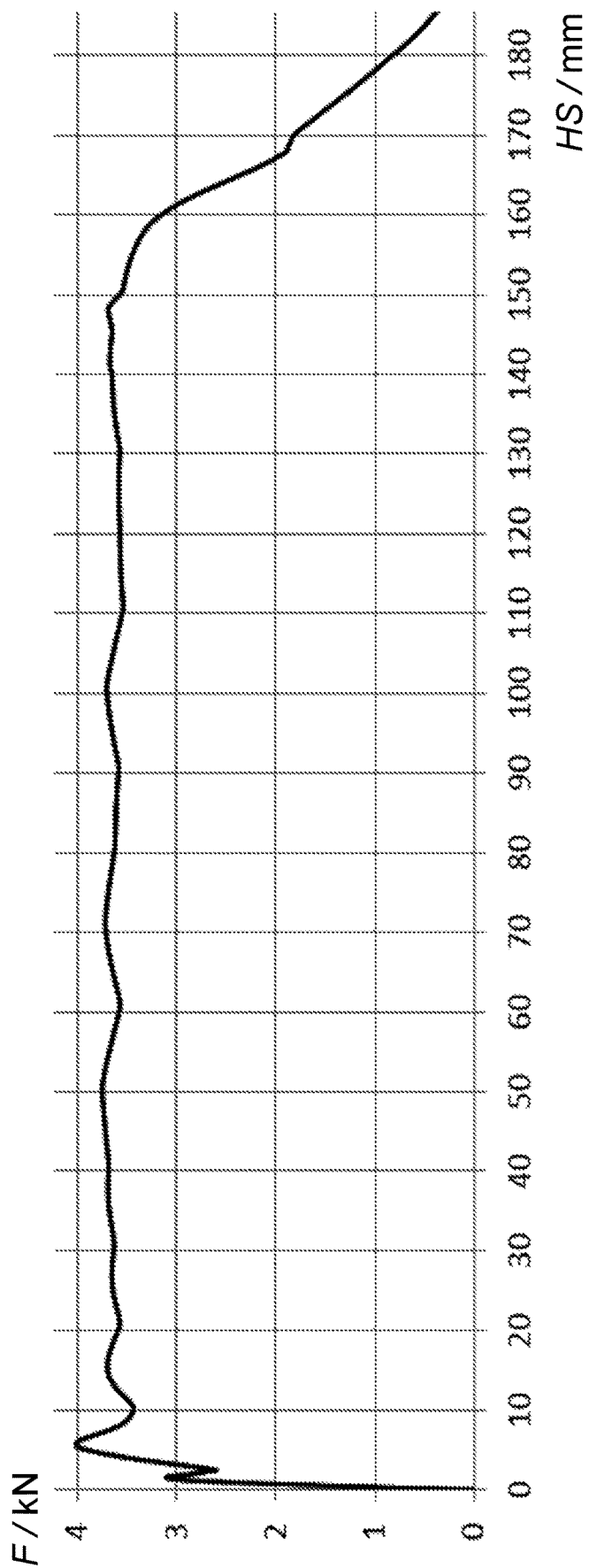
Figure 12:
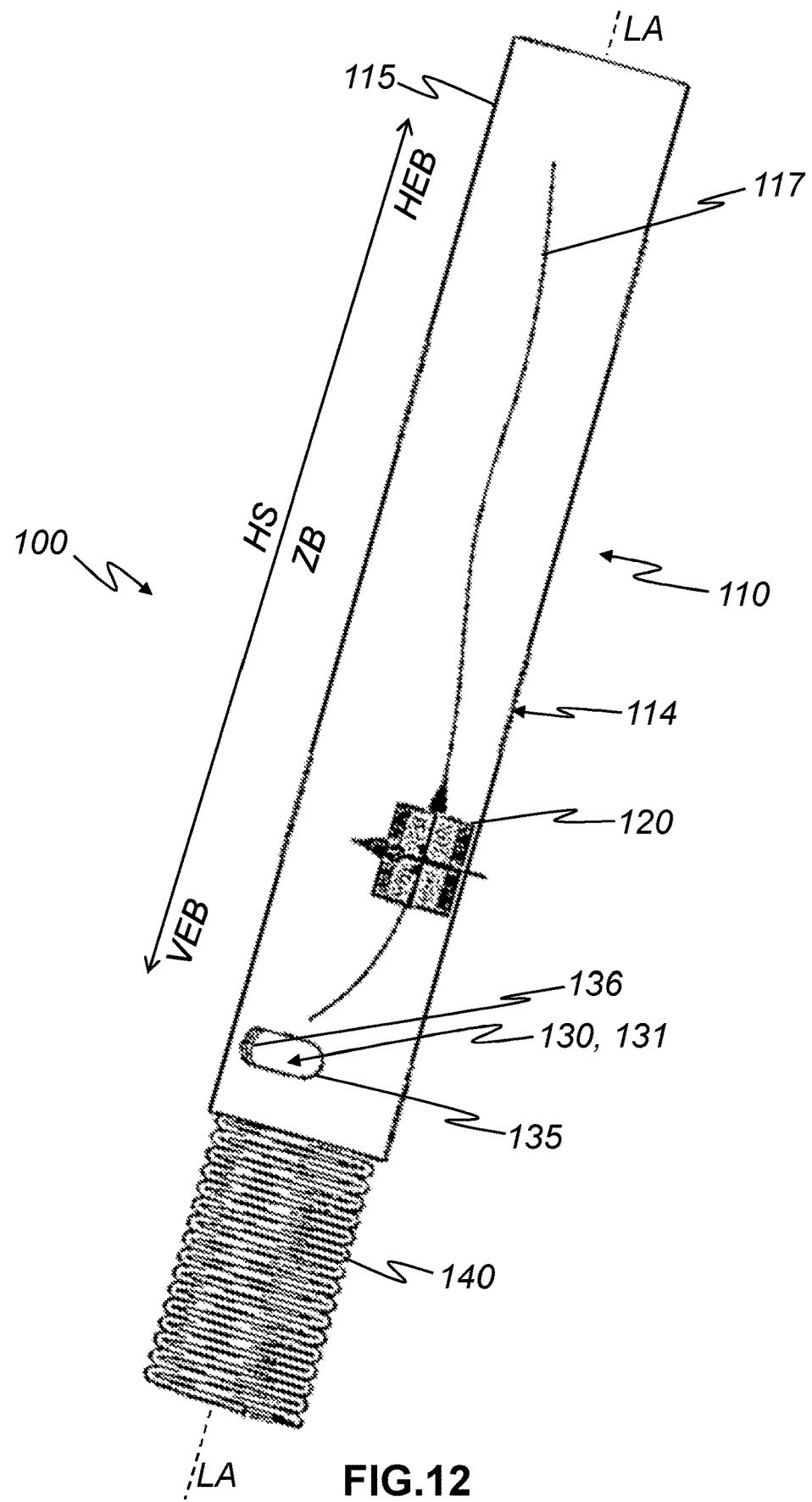
Figure 13:
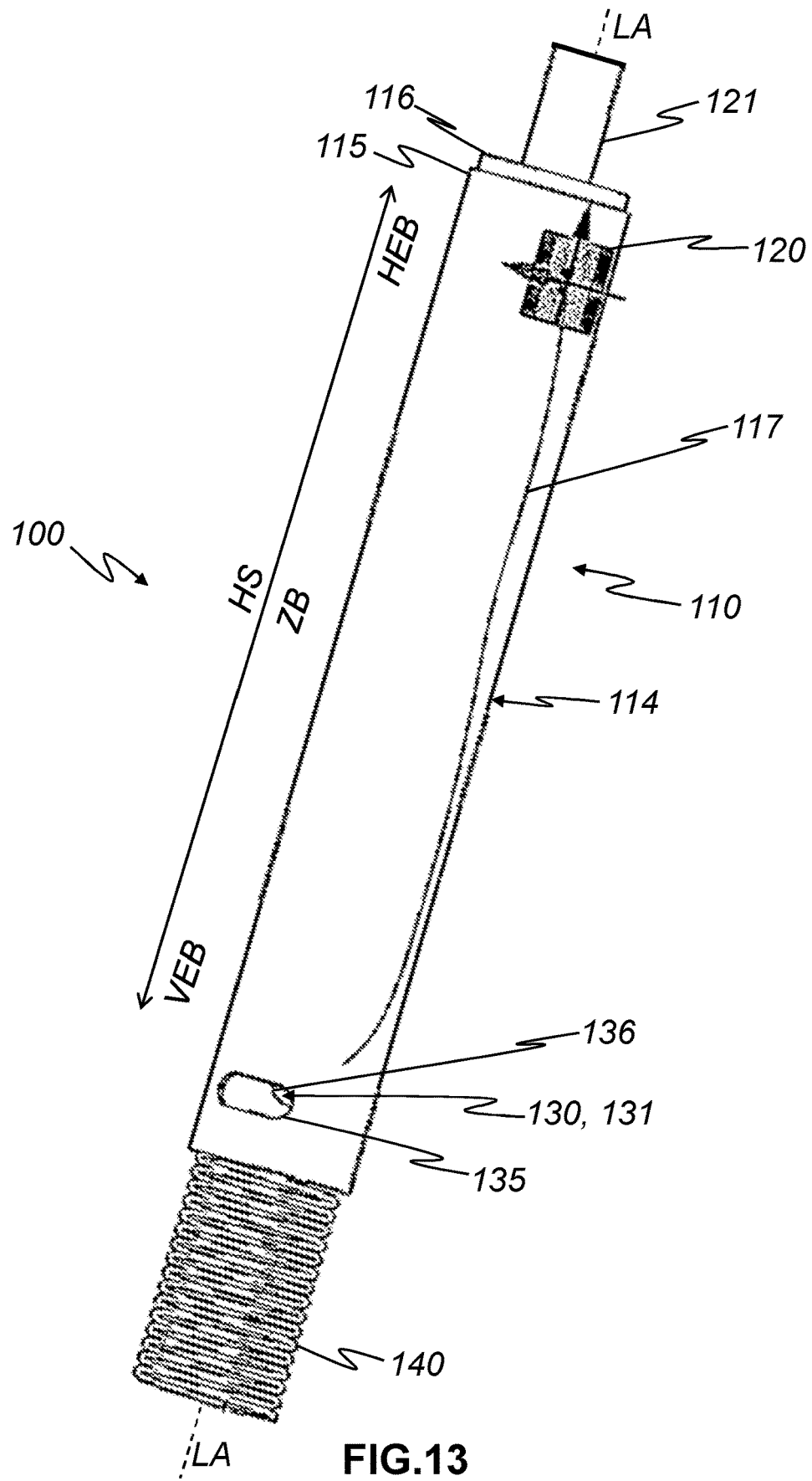

FIG. 6 schematically shows an exemplary progression of the cross-sectional area adjacent to the piston of a fluid damper according to embodiments of the invention;

FIG. 7 shows an exemplary progression of the cross-sectional area adjacent to the piston of a fluid damper according to embodiments of the invention in case of a passenger having an upper body mass of 17.6 kg;

FIG. 8 shows an exemplary progression of the cross-sectional area adjacent to the piston of a fluid damper according to embodiments of the invention in case of a passenger having an upper body mass of 32.5 kg;

FIG. 9 shows an exemplary simulation of the progression of the damping force of a fluid damper according to embodiments of the invention depending on the position of the piston along the stroke length in case of a passenger having an upper body mass of 17.6 kg;

FIG. 10 shows an exemplary simulation of the progression of the damping force of a fluid damper according to embodiments of the invention depending on the position of the piston along the stroke length in case of a passenger having an upper body mass of 32.5 kg;

FIG. 11 shows an exemplary simulation of the progression of the damping force of a fluid damper according to embodiments of the invention depending on the position of the piston along the stroke length in case of a passenger having an upper body mass of 25 kg;

FIG. 12 shows a schematic view of another fluid damper according to embodiments of the invention in a state for a low passenger weight; and FIG. 13 shows a schematic view of the fluid damper of FIG. 12 in a state for a high passenger weight.

DETAILED DESCRIPTION

Figure 1:
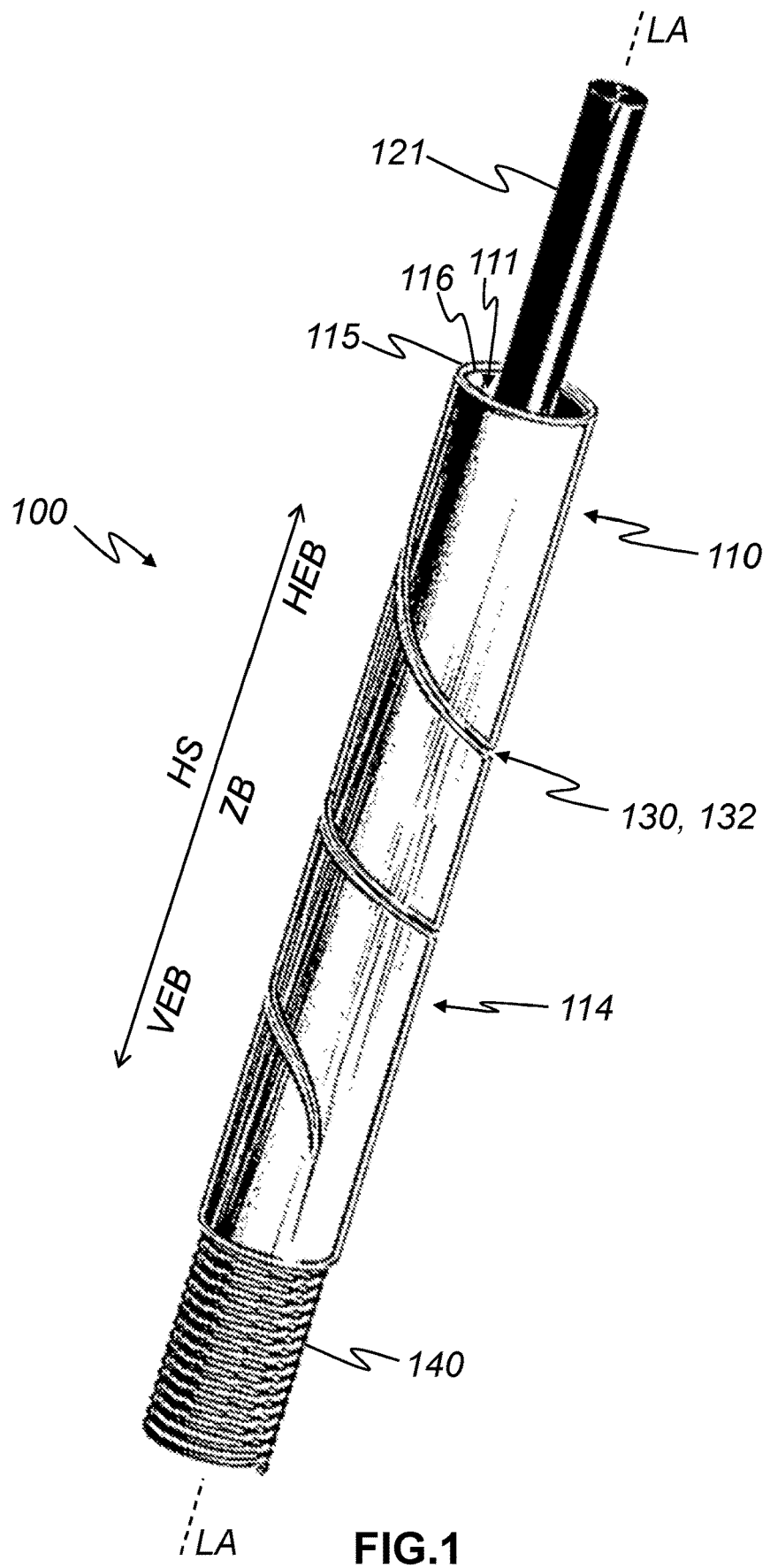
FIG. 1 shows a schematic view of a fluid damper according to embodiments of the invention.

FIG. 1 shows a schematic view of a fluid damper 100 according to embodiments of the invention for modulating a retaining force of a seat belt (not illustrated).

The illustrated fluid damper 100 comprises a cylinder 110 having an inner space 111 filled with a damping fluid (not illustrated) and a piston (not illustrated) shiftable in the inner space 111 along a longitudinal axis LA of the cylinder 110 from a rear end portion HEB of a stroke length HS to a front-end portion VEB of the stroke length HS.

The piston divides the inner space 111 into a front fluid chamber (not illustrated) in front of the piston along the longitudinal axis LA and a rear fluid chamber (not illustrated) behind the piston along the longitudinal axis LA.

The piston is, for example, fixed to a piston rod 121 lead out of the cylinder 110 along the longitudinal axis LA.

A shell wall 114 of the cylinder 110 comprises a duct 130 configured as a groove 132, the groove 132 conductively connecting for the damping fluid the front fluid chamber to the rear fluid chamber.

For a better visibility, the groove 132 is illustrated as an aperture through the shell wall 114. In this case, the cylinder 110 must be enclosed by a sleeve (not illustrated) preventing a leakage of damping fluid from the inner space 111 through the groove 132. Alternatively, the groove 132 may have a groove bottom defining a depth of the groove 132 radial to the longitudinal axis LA.

In the example shown, the groove 132 extends helically about the longitudinal axis LA, a pitch of the groove 132 along the longitudinal axis LA being larger in the two end portions HEB, VEB of the stroke length HS than in the central portion ZB of the stroke length HS.

In this way, the groove 132 has a width in the circumferential direction about the longitudinal axis LA, which is smaller in the two end portions HEB, VEB of the stroke length HS than in the central portion ZB of the stroke length HS.

In this way, the groove 132 for the passage of the damping fluid has a cross sectional area, which is smaller in the two end portions HEB, VEB of the stroke length HS than in a central portion ZB of the stroke length HS located between the two end portions HEB, VEB.

In the example shown, the cylinder 110 comprises an outer cylinder 115 and an inner cylinder 116, the outer cylinder 115 and the inner cylinder 116 being arranged coaxial to the longitudinal axis LA, an outer shell surface of the inner cylinder 116, for the damping fluid, sealingly abutting on an inner shell surface of the outer cylinder 115.

The illustrated fluid damper 100 comprises a spring element 140, for example a helical compression spring. In the example shown, the spring element 140 biases the inner cylinder 116 relative to the outer cylinder 115 along the longitudinal axis LA into a rest position, the inner cylinder 116 being linearly deflectable relative to the outer cylinder 115 along the longitudinal axis LA from the rest position against the spring force of the spring element 140 by a force acting on the piston along the longitudinal axis LA.

Figure 2:
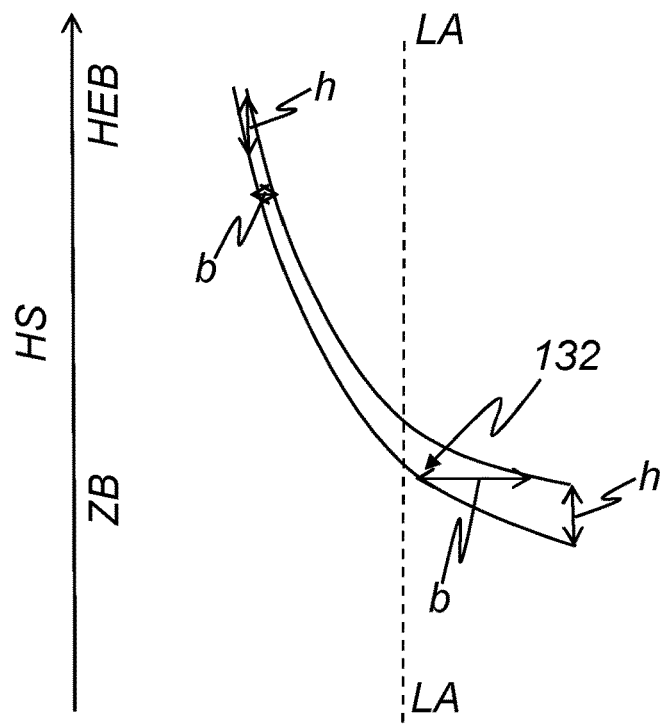
FIG. 2 shows a detail of the groove of the fluid damper of FIG. 1.

FIG. 2 shows a schematic detail of the groove 132 of the fluid damper of FIG. 1 in the rear end portion HEB and in the central portion ZB of the stroke length HS. The shown groove 132 is formed so that, in the circumferential direction about the longitudinal axis LA, it has a width b which is larger in the central portion ZB than in the rear end portion HEB of the stroke length HS.

The groove 132 is may be formed so that, along the entire stroke length HS, it has a constant height h along the longitudinal axis LA.

Figure 3:
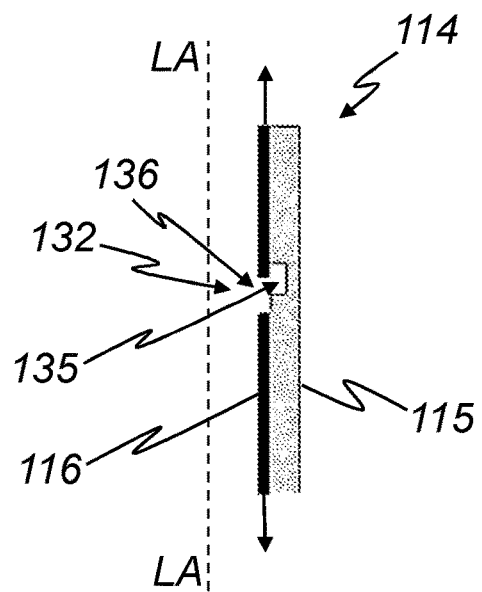
FIG. 3 shows a schematic longitudinal cross-sectional view of a detail of the shell wall of the cylinder of the fluid damper of FIG. 1.

FIG. 3 shows a schematic longitudinal cross-sectional view along the longitudinal axis LA of a detail of the shell wall 114 of the cylinder 110 of the fluid damper of FIG. 1.

In FIG. 3, it can be clearly seen that the cylinder 110 is composed of an outer cylinder 115 and an inner cylinder 116 arranged therein, the inner cylinder 116 being linearly deflectable relative to the outer cylinder 115 along the longitudinal axis LA (symbolised by arrows).

The groove 132 in the shell wall 114 of the cylinder 110 comprises an outer duct portion 135 configured as an outer groove section in the outer cylinder 115 and an inner duct portion 136 configured as an inner groove section in the inner cylinder 116. The inner duct portion 136 is an aperture through the inner cylinder 116. In the embodiment shown in FIG. 3, the outer duct portion 135 has a depth defined by a groove bottom radial to longitudinal axis LA.

When the inner cylinder 116 is linearly displaced relative to the outer cylinder 115 along the longitudinal axis LA, for example by the force acting on the piston (not illustrated) of the fluid damper along the longitudinal axis LA, the overlap of the two duct portions 135, 136 and thus the depth of the groove 132 effective for the passage of the damping fluid will be changed thereby radial to the longitudinal axis LA.

In the relative position of the inner cylinder 116 and the outer cylinder 115 relative to each other shown in FIG. 3 the two duct portions 135, 136 have, for example, an overlap of about 50%. In this way, the depth of the outer duct portion 135 only contributes about 50% to the effective depth of the entire groove 132.

Figure 4:
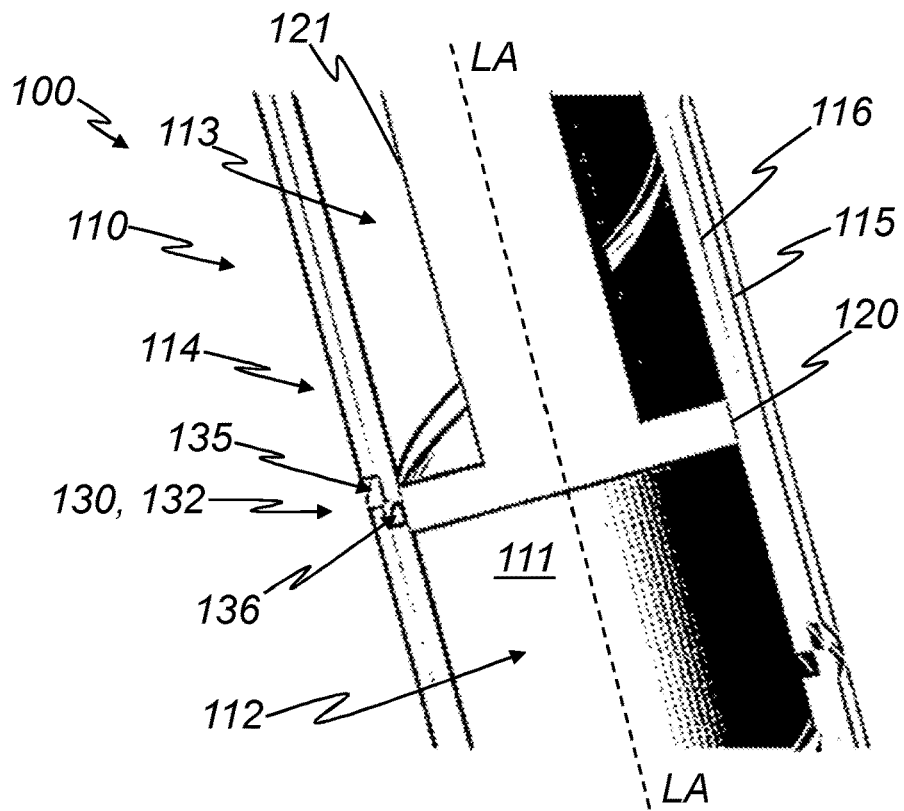
FIG. 4 shows a schematic longitudinal cross-sectional view of a detail of the fluid damper of FIG. 1 in a state for a high passenger weight.

FIG. 4 shows a schematic longitudinal cross-sectional view along the longitudinal axis LA of a detail of the fluid damper 100 of FIG. 1 in a state in case of a high passenger weight or a high impact speed.

It can be seen in FIG. 4 that the piston 120 of the fluid damper 100 divides the inner space 111 of the cylinder 110 of the fluid damper 100 into a front fluid chamber 112 and a rear fluid chamber 113 along the longitudinal axis LA.

It can further be seen that the groove 132 in the shell wall 114 of the cylinder 110 as a duct 130 for the damping fluid conductively connects the front fluid chamber 112 to the rear fluid chamber 113 and therefore forms a bypass for the damping fluid around the piston 120.

The groove 132 comprises an outer duct portion 135 configured as an outer groove section in the outer cylinder 115 and an inner duct portion 136 configured as an inner groove section in the inner cylinder 116. The inner duct portion 136 is an aperture through the inner cylinder 116. For a better visibility, the outer duct portion 135 is illustrated as an aperture through the outer cylinder 115 in FIG. 4. Alternatively, the outer duct portion 135 may have a depth defined by a groove bottom radial to the longitudinal axis LA.

In the relative position of the inner cylinder 116 and the outer cylinder 115 relative to each other shown in FIG. 4, the two duct portions 135, 136 have a minimum overlap. In this way, the depth of the outer duct portion 135 minimally contributes to the effective depth of the entire groove 132. Consequently, the cross-sectional area for the passage of the damping fluid through the groove 132 is minimum and the damping force of the fluid damper 100 is maximum.

Relative to the outer cylinder 115, the inner cylinder 116 should therefore be displaced into the position shown in FIG. 4 by a passenger having the maximum mass and/or by an accident at the maximum impact speed for which the fluid damper 100 is designed so that the passenger experiences the maximum retaining force of a seat belt (not illustrated) coupled to the fluid damper 100.

Figure 5:
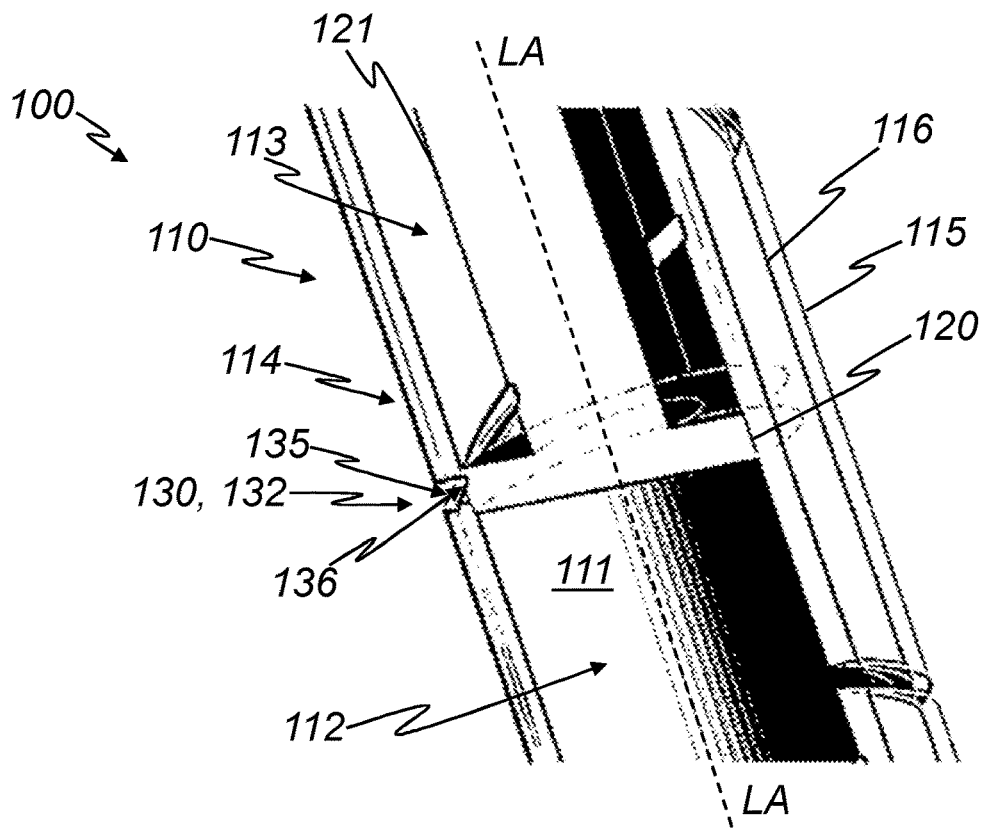
FIG. 5 shows another schematic longitudinal cross-sectional view of a detail of the fluid damper of FIG. 1 in a state for a low passenger weight.

FIG. 5 shows another schematic longitudinal cross-sectional view along the longitudinal axis LA of a detail of the fluid damper 100 of FIG. 1 in a state in case of a low passenger weight or a low impact speed.

FIG. 5 differs from FIG. 4 in that the two duct portions 135, 136 have a maximum overlap in the relative position of the inner cylinder 116 and the outer cylinder 115 relative to each other shown in FIG. 5. In this way, the depth of the outer duct portion 135 contributes maximally to the effective depth of the entire groove 132. Consequently, the cross-sectional area for the passage of the damping fluid through the groove 132 is maximal, and the damping force of the fluid damper 100 minimal.

Therefore, the inner cylinder 116 should be displaced into the position shown in FIG. 5 relative to the outer cylinder 115 by a passenger having the minimum mass and/or an accident at the minimum impact speed for which the fluid damper 100 is designed so that the passenger experiences the minimum retaining force by a seat belt (not illustrated) coupled to the fluid damper 100.

The relative position of the inner cylinder 116 and the outer cylinder 115 relative to each other shown in FIG. 5 may coincide with the rest position of the inner cylinder 116 in which the inner cylinder 116 is biased by the spring element (not illustrated) of the fluid damper 100.

FIG. 6 schematically shows an exemplary progression of the cross-sectional area Q of the groove in the cylinder shell of the cylinder of the fluid damper adjacent to the piston of a fluid damper according to embodiments of the invention depending on the position of the piston along the stroke length HS of the piston.

The cross-sectional area Q adjacent to the piston is smaller in the two end portions HEB, VEB of the stroke length HS than in a central portion ZB of the stroke length HS located between the two end portions HEB, VEB.

In an embodiment, the progression of the cross-sectional area Q corresponds to an expected progression of a speed of the piston along the stroke length HS. The progression of the speed of the piston may, for example, depend on the individual crash behaviour of a vehicle in which the fluid damper is deployed. The damping force of the fluid damper may be adapted to a non-uniform progression of the speed of the piston by an appropriate design of the progression of the cross-sectional area.

FIG. 7 shows an exemplary progression of the cross-sectional area Q in mm$^2$ of the groove in the cylinder shell of the cylinder of the fluid damper adjacent to the piston of a fluid damper according to embodiments of the invention depending on the position in mm of the piston along the stroke length HS of the piston.

In FIG. 7, the state is illustrated in which the inner cylinder of the fluid damper is in the rest position in which the overlap of the inner groove section and the outer groove section is maximal so that a maximum cross-sectional area and therefore a minimum damping force is obtained. This state will, for example, occur when a seat belt coupled to the fluid damper retains a passenger having an upper body mass of 17.6 kg in a vehicle having a mass of 1572 kg at an impact speed of 50 km/h.

For the specification of the retaining force of a seat belt, only the upper body mass of the retained passenger including the head mass, arm mass, and torso mass of the passenger is relevant. The lower part of the passenger's body is usually so tightly fixed to the seat by the lap belt that the lower part of the body will not experience a substantial acceleration relative to the seat so that the mass of the lower part of the body is irrelevant for the retaining force of the seat belt.

FIG. 8 shows an exemplary progression of the cross-sectional area Q in mm$^2$ of the groove in the cylinder shell of the cylinder of the fluid damper adjacent to the piston of a fluid damper according to embodiments of the invention depending on the position in mm of the piston along the stroke length HS of the piston.

In FIG. 8, the state is illustrated in which the inner cylinder of the fluid damper is maximally displaced from the rest position so that the overlap of the inner groove section and the outer groove section is minimal so that a minimum cross-sectional area and therefore a maximum damping force are obtained. This state will occur when, for example, a seat belt coupled to the fluid damper retains a passenger having an upper body mass of 32.5 kg in a vehicle having a mass of 1572 kg at an impact speed of 50 km/h.

FIG. 9 shows an exemplary simulation of the progression of the damping force F in kN of a fluid damper according to embodiments of the invention depending on the position in mm of the piston along the stroke length HS of the piston when a seat belt coupled to the fluid damper retains a passenger having an upper body mass of 17.6 kg in a vehicle having a mass of 1572 kg at an impact speed of 50 km/h.

In this case, the inner cylinder of the fluid damper is in the rest position in which the overlap of the inner groove section and the outer groove section is maximal so that a maximum cross-sectional area and therefore a minimum damping force are obtained. The damping force amounts to, for example, about 2.5 kN and is substantially constant along the stroke length HS.

FIG. 10 shows an exemplary simulation of the progression of the damping force F in kN of a fluid damper according to embodiments of the invention depending on the position in mm of the piston along the stroke length HS of the piston when a seat belt coupled to the fluid damper retains a passenger having an upper body mass of 32.5 kg in a vehicle having a mass of 1572 kg at an impact speed of 50 km/h.

In this case, the inner cylinder of the fluid damper is maximally displaced from the rest position so that the overlap of the inner groove section and the outer groove section is minimal so that a minimum cross-sectional area and therefore a maximum damping force are obtained. The damping force amounts to, for example, about 4.5 kN and is substantially constant along the stroke length HS.

FIG. 11 shows an exemplary simulation of the progression of the damping force F in kN of a fluid damper according to embodiments of the invention depending on the position in mm of the piston along the stroke length HS of the piston when a seat belt coupled to the fluid damper retains a passenger having an upper body mass of 25 kg in a vehicle having a mass of 1572 kg at an impact speed of 50 km/h.

In this case, the inner cylinder of the fluid damper is in an intermediate position between the rest position and the maximum displacement therefrom so that the damping force is between its minimum and maximum values, for example, amounts to 3.5 kN, and may be substantially constant along the stroke length HS.

The progression of the damping force F depends on the mass and the fluid dynamic damping of the inner cylinder. For the progression of the damping force F shown in FIGS. 9 to 11, a mass of 275 g and a dampening of 500 Ns/m were assumed.

FIG. 12 shows a schematic view of another fluid damper 100 according to embodiments of the invention for modulating a retaining force of a seat belt (not illustrated) in a state in case of a low passenger weight or a low impact speed.

The fluid damper 100 shown in FIG. 12 differs from the fluid damper 100 illustrated in FIGS. 1 to 5 in that the duct 130 is not formed as a groove, but as a radial duct 131. The radial duct 131 connects the front fluid chamber (not labelled) of the fluid damper 100 to, for example, a reservoir (not illustrated) for the damping fluid located outside of the inner space (not labelled) of the fluid damper 100. The radial duct 131 comprises an outer duct portion 135 through the outer cylinder 115 and an inner duct portion 136 through the inner cylinder (not labelled) of the fluid damper 100. For example, the duct portions 135, 136 are respectively configured as an elongated hole, particularly with identical cross-sectional areas along the shell wall 114 of the cylinder 110.

In the state shown in FIG. 12 which corresponds to, for example, a rest position of the inner cylinder 116, for example, the duct portions 135, 136 congruently superimpose each other radial to the longitudinal axis LA. In this way, the damping fluid experiences a small flow resistance in the radial duct 131 so that the fluid damper 100 provides for a small damping force suitable as, for example, a retaining force of the seat belt for a light-weight passenger or a low impact speed.

The inner cylinder is deflectable relative to the outer cylinder 115 from a rest position by a force acting on the piston 120 along the longitudinal axis LA, for example linearly along the longitudinal axis LA so that the deflection of the inner cylinder causes an adjustment of an overlap of the outer duct portion 135 and the inner duct portion 136 along the shell surfaces of the outer cylinder 115 and the inner cylinder 116 depending on the magnitude of the force.

In addition, the inner cylinder is may be movable relative to the outer cylinder 115 along the longitudinal axis LA, particularly so that it rotates about the longitudinal axis LA, by shifting the piston 120 along the longitudinal axis LA so that the movement of the inner cylinder 116 causes an adjustment of the overlap of the outer duct portion 135 and the inner duct portion 136 along the shell surfaces of the outer cylinder 115 and the inner cylinder 116 depending on the position of the piston 120 along the stroke length HS. For this purpose, the piston 120 is connected to the inner cylinder, for example via a slide guide 117.

FIG. 13 shows a schematic view of the fluid damper 100 of FIG. 12 in a state in case of a high passenger weight or a high impact speed.

The high passenger weight or the high impact speed causes a large force along the longitudinal axis LA on the piston 120 of the fluid damper 100 via the seat belt. Therefore, the inner cylinder 116 is linearly displaced relative to the outer cylinder 115 from the rest position along the longitudinal axis LA (upwards in FIG. 13) against the spring force of the spring element 140. In this way, the overlap of the outer duct portion 135 and the inner duct portion 136 is reduced so that the flow resistance acting on the damping fluid in the radial duct 131 increases. In this way, the fluid damper 100 provides for a higher damping force in the state shown in FIG. 13 than in the state shown in FIG. 12.

As compared to FIG. 12, the piston 120 of the fluid damper 100 is shifted along the longitudinal axis LA in FIG. 13, for example from the central portion ZB of the stroke length HS to the rear end portion HEB of the stroke length HS. Due to this displacement, the inner cylinder 116 is moved to rotate about the longitudinal axis LA relative to the outer cylinder 115, for example by a slide guide 117 between the piston 120 and the inner cylinder 116. The rotational movement of the inner cylinder 116 causes a reduction of the overlap of the outer duct portion 135 and the inner duct portion 136 in FIG. 13 as compared to FIG. 12.

The reduced overlap increases the flow resistance of the damping fluid through the radial duct 131 and thereby prevents a decrease in the damping force of the fluid damper 100 when the piston moves more slowly along the longitudinal axis LA in the end portions VEB, HEB of the stroke length HS than in the central portion ZB of the stroke length HS.

Although the invention has been illustrated and described in greater detail with reference to the preferred exemplary embodiments, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

| List of reference numerals | |
|---|---|
| 100 | Fluid damper |
| 110 | Cylinder |
| 111 | Inner space |
| 112 | Front fluid chamber |
| 113 | Rear fluid chamber |
| 114 | Shell wall |
| 115 | Outer cylinder |
| 116 | Inner cylinder |
| 117 | Slide guide |
| 120 | Piston |
| 121 | Piston rod |
| 130 | Duct |
| 131 | Radial duct |
| 132 | Groove |
| 135 | Outer duct portion |
| 136 | Inner duct portion |
| 140 | Spring element |
| b | Width |
| F | Damping force |
| h | Height |
| HEB | Rear end portion |
| HS | Stroke distance |
| LA | Longitudinal axis |
| Q | Cross sectional area |
| VEB | Front end portion |
| ZB | Central portion |

The invention claimed is:

1. A fluid damper for modulating a retaining force of a seat belt,
   a. the fluid damper comprising an outer cylinder and an inner cylinder arranged in the outer cylinder coaxial to a common longitudinal axis;
   b. the inner cylinder enclosing an inner space filled with a damping fluid;
   c. the fluid damper comprising a piston shiftable in the inner space along the longitudinal axis along a stroke length;
   d. the fluid damper comprising at least one duct; and
   e. the at least one duct conductively connecting for the damping fluid a front fluid chamber disposed in front of the piston along the longitudinal axis to a rear fluid chamber disposed behind the piston along the longitudinal axis and/or a reservoir for the damping fluid disposed outside of the inner space;
   wherein
   f. the at least one duct comprises an outer duct portion in a shell wall of the outer cylinder and an inner duct portion in a shell wall of the inner cylinder;
   g. an outer shell surface of the inner cylinder abuts on an inner shell surface of the outer cylinder to be sealing for the damping fluid; and
   h. the inner cylinder is deflectable relative to the outer cylinder from a rest position by a force acting on the piston along the longitudinal axis, so that the deflection of the inner cylinder causes an adjustment of an overlap of the outer duct portion and the inner duct portion along the shell surfaces depending on the magnitude of the force.

2. The fluid damper according to claim 1, wherein the inner cylinder is linearly deflectable from the rest position along the longitudinal axis by the force acting on the piston along the longitudinal axis, so that the linear deflection of the inner cylinder causes an adjustment of the overlap of the outer duct portion and the inner duct portion along the shell surfaces depending on the magnitude of the force.

3. The fluid damper according to claim 1, wherein the fluid damper comprises a spring element, the spring element counteracting the deflection of the inner cylinder relative to the outer cylinder from the rest position.

4. The fluid damper according to claim 1, wherein the inner cylinder is movable relative to the outer cylinder by shifting the piston along the longitudinal axis, so that the movement of the inner cylinder causes an adjustment of the overlap of the outer duct portion and the inner duct portion along the shell surfaces depending on the position of the piston along the stroke length.

5. The fluid damper according to claim 4, wherein the inner cylinder is rotatably movable relative to the outer cylinder about the longitudinal axis by shifting the piston, so that the rotational movement of the inner cylinder causes an adjustment of the overlap of the outer duct portion and the inner duct portion along the shell surfaces depending on the position of the piston along the stroke length.

6. The fluid damper according to claim 5, wherein the inner cylinder is rotatable relative to the outer cylinder about the longitudinal axis by the piston via a slide guide.

7. The fluid damper according to claim 1, wherein the at least one duct comprises a radial duct for the passage of the damping fluid from the front fluid chamber radial to the longitudinal axis through the shell wall of the inner cylinder and of the outer cylinder.

8. The fluid damper according to claim 1, wherein the at least one duct comprises a groove in the shell wall of the inner cylinder and of the outer cylinder for guiding the damping fluid past the piston from the front fluid chamber into the rear fluid chamber.

9. The fluid damper according to claim 8, wherein
 a. the groove for the passage of the damping fluid has a cross sectional area; and
 b. the cross-sectional area is smaller in two end portions of the stroke length than in a central portion of the stroke length located between the two end portions.

10. The fluid damper according to claim 9, wherein
 a. the groove has a width in the circumferential direction about the longitudinal axis; and
 b. the width is smaller in the two end portions of the stroke length than in the central portion of the stroke length.

11. The fluid damper according to claim 10, wherein
 a. the groove helically surrounds the longitudinal axis; and
 b. a pitch of the groove along the longitudinal axis is larger in the two end portions of the stroke length than in the central portion of the stroke length.

12. The fluid damper according to claim 11, wherein
 a. the groove has a height along a deflection direction of the deflection of the inner cylinder from the rest position; and
 b. the height is constant along the stroke length.

13. A belt force limiter for a seat belt, wherein
the belt force limiter comprises a fluid damper according to claim 1 for modulating a retaining force of the seat belt.

* * * * *